(12) United States Patent
Li et al.

(10) Patent No.: US 11,756,588 B2
(45) Date of Patent: Sep. 12, 2023

(54) IMAGE PROCESSING METHOD AND APPARATUS

(71) Applicant: BEIJING BYTEDANCE NETWORK TECHNOLOGY CO., LTD., Beijing (CN)

(72) Inventors: Xiaoqi Li, Beijing (CN); Guangyao Ni, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/849,859

(22) Filed: Jun. 27, 2022

(65) Prior Publication Data

US 2022/0328072 A1 Oct. 13, 2022

Related U.S. Application Data

(63) Continuation of application No. PCT/CN2020/134683, filed on Dec. 8, 2020.

(30) Foreign Application Priority Data

Dec. 30, 2019 (CN) .......................... 201911397521.4

(51) Int. Cl.
*G11B 27/036* (2006.01)
*H04N 5/272* (2006.01)
(52) U.S. Cl.
CPC ........... *G11B 27/036* (2013.01); *H04N 5/272* (2013.01)
(58) Field of Classification Search
CPC .............................. G11B 27/036; H04N 5/272
See application file for complete search history.

(56) References Cited

U.S. PATENT DOCUMENTS

2015/0063785 A1 3/2015 Lee et al.
2018/0174370 A1 6/2018 Chen et al.
2020/0272309 A1 8/2020 Xiao et al.

FOREIGN PATENT DOCUMENTS

CN 104346157 A 2/2015
CN 107590810 A 1/2018
CN 107665482 A 2/2018
(Continued)

OTHER PUBLICATIONS

Extended European Search Report dated Nov. 29, 2022 in European Application No. 20910034.6.
(Continued)

*Primary Examiner* — Mishawn N. Hunter

(57) ABSTRACT

The present disclosure discloses an image processing method and apparatus, an electronic device, and a computer-readable storage medium. The method therein includes: acquiring an original video; selecting, from the original video, a first video frame image; selecting, from the original video, a second video frame image in which a target object is contained, and separating, from the second video frame image, an image portion occupied by the target object in the second video frame image; performing transparentization processing on the image portion occupied by the target object in the second video frame image to obtain a transparentized image, and superposing the transparentized image on the first video frame image to obtain a special effect image; and replacing, in the original video, the second video frame image with the special effect image to form a target video.

13 Claims, 5 Drawing Sheets

(56) References Cited

FOREIGN PATENT DOCUMENTS

| | | |
|---|---|---|
| CN | 107705279 A | 2/2018 |
| CN | 108702463 A | 10/2018 |
| CN | 108933905 A | 12/2018 |
| WO | WO2015018297 A | 2/2015 |
| WO | WO2019084712 A1 | 5/2019 |
| WO | WO2019141100 A1 | 7/2019 |

OTHER PUBLICATIONS

First Office Action from CN Application No. 201911397521.4 with English translation (11 pages).
Second Office Action dated Mar. 30, 2022 in CN Application No. 201911397521.4 with English translation (12 pages).
Rejection Decision dated Jun. 30, 2022 in CN Application No. 201911397521.4 with English translation (15 pages).
Search Report and Written Opinion dated Mar. 11, 2021 in PCT Application No. PCT/CN2020/134683 with English translation (15 pages).
First Research from CN Application No. 201911397521.4 (2 pages).

IMAGE PROCESSING METHOD AND APPARATUS

This application is a continuation of International Application No. PCT/CN2020/134683, as filed on Dec. 8, 2020, which claims priority to Chinese patent application No. 201911397521.4 filed with the Chinese Patent Office on Dec. 30, 2019 and entitled "IMAGE PROCESSING METHOD AND APPARATUS". The disclosure of each of these applications is hereby incorporated by reference into the present application in its entirety.

TECHNICAL FIELD

The present disclosure relates to the technical field of image processing, and particularly to an image processing method and apparatus and a computer-readable storage medium.

BACKGROUND

With the continuous development of Internet technology and image processing technology, adding special effects into images has gradually been sought after by people when the images are shot. A user can add his favorite special effects into the shot images by selecting a corresponding special effect function, so as to increase the pleasure in image shooting.

The image special effect function in the related art is not flexible enough.

SUMMARY

The "SUMMARY" is provided to introduce concepts in a simplified form, which will be described in detail below in the following "DETAILED DESCRIPTION OF THE DRAWINGS". The "SUMMARY" is not intended to identify key features or essential features of the claimed technical solutions, nor is it intended to limit the scope of the claimed technical solutions.

A technical problem to be solved by the present disclosure is to provide an image processing method, to at least partially solve the technical problem in the related art that a display effect of the image special effect function is not flexible enough. In addition, an image processing apparatus, an image processing hardware apparatus, a computer-readable storage medium, and an image processing terminal are also provided.

In order to achieve the above objective, according to an aspect of the present disclosure, the following technical solution is provided:

an image processing method, comprising:
acquiring an original video;
selecting, from the original video, a first video frame image;
selecting, from the original video, a second video frame image in which a target object is contained, and separating, from the second video frame image, an image portion occupied by the target object in the second video frame image;
performing transparentization processing on the image portion occupied by the target object in the second video frame image to obtain a transparentized image, and superposing the transparentized image on the first video frame image to obtain a special effect image; and
replacing, in the original video, the second video frame image with the special effect image to form a target video.

In order to achieve the above objective, according to an aspect of the present disclosure, the following technical solution is provided:

an image processing apparatus, comprising:
a video acquisition module configured to acquire an original video; an image selection module configured to select, from the original video, a first video frame image;
the image selection module further configured to select, from the original video, a second video frame image in which a target object is contained, and separate, from the second video frame image, an image portion occupied by the target object in the second video frame image;
a transparentization processing module configured to perform transparentization processing on the image portion occupied by the target object in the second video frame image to obtain a transparentized image, and superpose the transparentized image on the first video frame image to obtain a special effect image; and
an image replacement module configured to replace, in the original video, the second video frame image with the special effect image to form a target video.

In order to achieve the above objective, according to an aspect of the present disclosure, the following technical solution is provided:

an electronic device, comprising:
a memory configured to store non-transitory computer-readable instructions; and
a processor configured to execute the computer-readable instructions, which, when being executed, cause the processor to implement the image processing method according to any of the above.

In order to achieve the above objective, according to an aspect of the present disclosure, the following technical solution is provided:

a non-transitory computer-readable storage medium configured to store computer-readable instructions which, when being executed by a computer, cause the computer to perform the image processing method according to any of the above.

In order to achieve the above objective, according to still another aspect of the present disclosure, the following technical solution is further provided:

an image processing terminal, comprising the image processing apparatus according to any of the above.

According to embodiments of the present disclosure, by acquiring an original video; selecting, from the original video, a first video frame image; selecting, from the original video, a second video frame image in which a target object is contained, and separating, from the second video frame image, an image portion occupied by the target object in the second video frame image; performing transparentization processing on the image portion occupied by the target object in the second video frame image to obtain a transparentized image, and superposing the transparentized image on the first video frame image to obtain a special effect image; and replacing, in the original video, the second video frame image with the special effect image to form a target video, a user can see the images of the same one target object in different video frames at the same time, and the display effect is more flexible.

The foregoing description is only an overview of the technical solutions of the present disclosure; and, in order to more clearly understand the technical means of the present disclosure, such that the present disclosure can be implemented according to the description, and in order to make the above and other objectives, features, and advantages of the present disclosure more clearly understood, the preferred embodiments are specifically illustrated below, and the detailed description made in conjunction with the accompanying drawings is as follows.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the drawings, identical or similar reference numbers refer to identical or similar elements. It should be understood that the drawings are schematic and that components and elements are not necessarily drawn to scale.

DETAILED DESCRIPTION

Figure 1A:
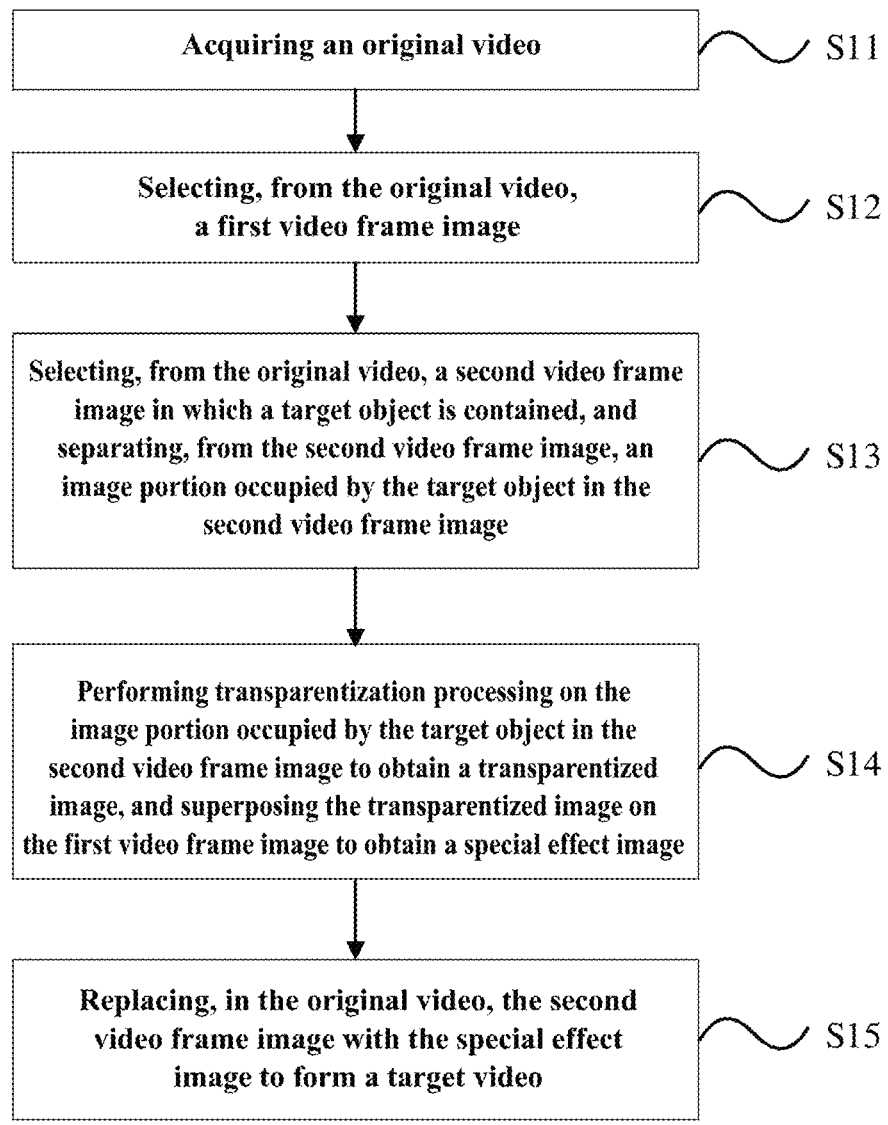
FIG. 1a is a schematic flow diagram of an image processing method according to an embodiment of the present disclosure.

Embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein. On the contrary, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that various steps recited in method embodiments of the present disclosure can be performed in a different order, and/or performed in parallel. Moreover, the method embodiments can include additional steps and/or omit performing the illustrated steps. The scope of the present disclosure is not limited in this respect.

A term "comprise" and variations thereof as used herein is intended to be open-minded, i.e., "comprising but not limited to". A term "based on" is "based at least in part on". A term "one embodiment" means "at least one embodiment"; a term "another embodiment" means "at least one additional embodiment"; and a term "some embodiments" means "at least some embodiments". Relevant definitions for other terms will be given in the following.

Embodiment 1

In order to solve the technical problem that the display effect of the image special effect function is not flexible enough in the related art, the present embodiment of the present disclosure provides an image processing method. As shown in FIG. 1a, the image processing method mainly comprises the following steps S11 to S15.

Step S11: acquiring an original video.

The original video image can be a live video, or a video pre-stored in a local terminal, or dynamic images, or an image sequence composed of a series of still images. Specifically, the video image can be acquired in real time through a camera or a video camera of a terminal. The terminal can be a mobile terminal (for example, a smartphone, an iPhone, a tablet computer, a notebook computer or a wearable device) or a fixed terminal (for example, a desktop computer).

Step S12: selecting, from the original video, a first video frame image.

The first video frame image may or may not contain a target object. The first video frame image can be the first frame image, an intermediate frame image, or the last frame image of the original video.

The target object can be preset, and can be, for example, a human image, an animal image (for example, a cat, a dog, etc.), or the like, and specifically, the target object can be obtained by detecting the video image by adopting an existing target detection algorithm. The target detection algorithm that can be adopted can be a deep learning-based target detection algorithm and a neural network-based image recognition algorithm.

Step S13: selecting, from the original video, a second video frame image in which the target object is contained, and separating, from the second video frame image, an image portion occupied by the target object in the second video frame image.

The target object is contained in the second video frame image, and can be a human image, an animal image (for example, a cat, a dog, etc.), or the like. When the first video frame image also contains the target object, the first video frame image and the second video frame image can contain the one same target object. The second video frame image can be the first frame image, an intermediate frame image, or the last frame image of the original video.

The first video frame image and the second video frame image are two different images (for example, positions and/or poses of the target object in the video are different). Except that the image portions of the target object in the video are different, remaining image portions in the first video frame image and the second video frame image, i.e., background image portions, can be the same or different.

Specifically, when the target object is contained in each frame image in the original video, two identical or similar images can be randomly selected as the first video frame image and the second video frame image, respectively. Alternatively, the second video frame image can be an image in the original video that is played after the first video frame image, that is, the playing time of the first video frame image in the original video is earlier than that of the second video frame image. For example, the latest video is collected as a second video frame image, and one frame image is selected as the first video frame image from historical video frame images which are the same as or similar to the second video frame image.

Step S14: performing transparentization processing on the image portion occupied by the target object in the second video frame image to obtain a transparentized image, and superposing the transparentized image on the first video frame image to obtain a special effect image.

Figure 1B:
FIG. 1b is a schematic diagram of a first video frame image in an image processing method according to an embodiment of the present disclosure.
Figure 1C:
FIG. 1c is a schematic diagram of an out-of-body (i.e., one's spirit has freed itself from the body) special effect image in an image processing method according to an embodiment of the present disclosure.

Specifically, as shown in FIG. 1b, taking an example that the target object is a human image, the effects of the special effect of the present embodiment are described, wherein FIG. 1b is the first video frame image and FIG. 1c is the special effect image, that is, the special effect image in which the out-of-body effect is realized.

Step S15: replacing, in the original video, the second video frame image with the special effect image to form a target video.

Specifically, if a special effect production scene is post-production of the existing video, the second video frame image is, in the original video, replaced with the special effect image, so that the target video can be obtained. If the special effect production scene is a scene in which real-time special effect processing is performed for the video being shot and played, the second video frame image can be replaced with the special effect image for playing when the second video frame image is shot, that is to say, the display of the original video in the playing process forms the target video, wherein the original video is the shot video and the target video is the displayed and played video.

In the present embodiment, by selecting, from the original video, a first video frame image; selecting, from the original video, a second video frame image in which a target object is contained, and separating, from the second video frame image, an image portion occupied by the target object in the second video frame image; performing transparentization processing on the image portion occupied by the target object in the second video frame image to obtain a transparentized image, and superposing the transparentized image on the first video frame image to obtain a special effect image; and replacing, in the original video, the second video frame image with the special effect image to form a target video, a user can see the images of the same one target object in different video frames at the same time, and the display effect is more flexible.

In an alternative embodiment, the target object is contained in the first video frame image, and an image portion occupied by the target object in the first video frame image is different from the image portion occupied by the target object in the second video frame image.

For example, the target object contained in the first video frame image can be an image in which a person is in full squat, and the target object contained in the second video frame image can be an image in which the person is in half squat or stands upright.

In an alternative embodiment, the step S14 specifically comprises:

step S141: acquiring first pixel values of red-blue-green three-color channels that correspond to the first video frame image.

The first pixel values comprise pixel values of at least one of a red color channel, a blue color channel, and a green color channel.

If the first video frame image is not a red-blue-green image, it can be converted into the red-blue-green image through color space conversion, and then the pixel values of the red-blue-green three-color channels are acquired.

Step S142: acquiring second pixel values of red-blue-green three-color channels that correspond to the image portion occupied by the target object in the second video frame image.

The second pixel values comprise pixel values of at least one of a red color channel, a blue color channel, and a green color channel.

If the image portion occupied by the target object in the second video frame image is not a red-blue-green image, it can be converted into the red-blue-green image through color space conversion, and then the pixel values of the red-blue-green three-color channels are acquired.

Step S143: determining a special effect image in accordance with the first pixel values, the second pixel values and a preset transparency.

The preset transparency can be customized, and may take a value of 0.5.

In an alternative embodiment, the step S143 specifically comprises:

determining the special effect image in accordance with formulae $r = r1 \times (1-a) + r0 \times a$, $g = g1 \times (1-a) + g0 \times a$, and $b = b1 \times (1-a) + b0 \times a$; where r, g, and b are pixel values of red, green, and blue channels that correspond to the special effect image, respectively, r1, g1, and b1 are pixel values of red, green, and blue channels that correspond to the first video frame image, respectively, and r0, g0, and b0 are pixel values of red, green, and blue channels that correspond to the image portion occupied by the target object in the second video frame image, respectively, a represents the preset transparency and a takes a value greater than 0 and less than 1.

Embodiment 2

Figure 2:
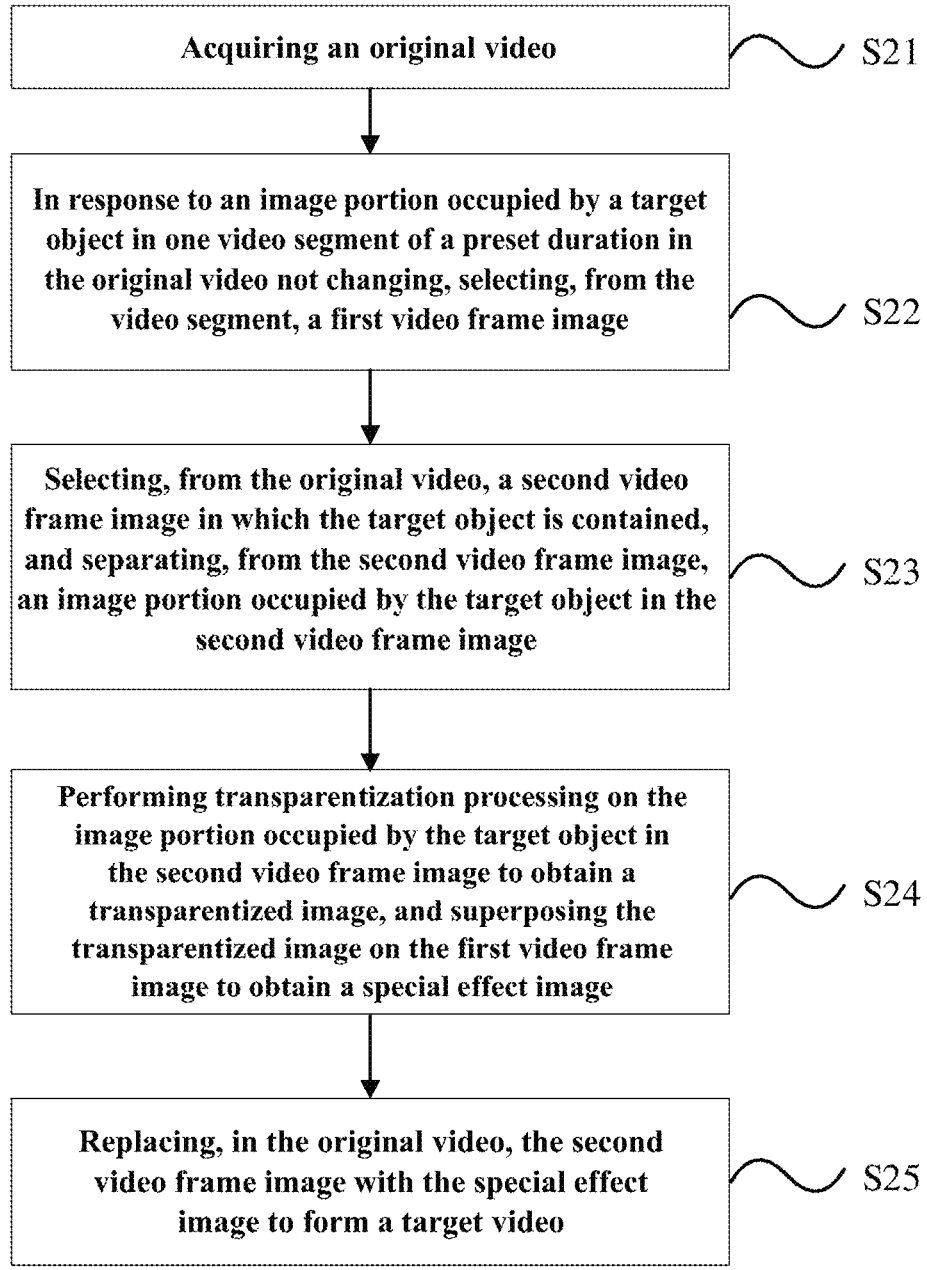
FIG. 2 is a schematic flow diagram of an image processing method according to an embodiment of the present disclosure.

On the basis of the foregoing embodiment, the present embodiment further limits the step of the selecting, from the original video, a first video frame image. Based on this limitation, a specific implementation of the present embodiment is as shown in FIG. 2, comprising the following step S21 to step S25.

Step S21: acquiring an original video.

Step S22: in response to an image portion occupied by the target object in one video segment of a preset duration in the original video not changing, selecting, from the video segment, the first video frame image.

The target object is contained in the first video frame image. Specifically, taking an example that the target object is a human image, in this step, if the target object (for example, a user) keeps, in the original video, one same pose for a preset duration (for example, 2 s), any frame image acquired from the original video within this duration is taken as the first video frame image. For example, the last frame image of the original video within the duration is taken as the first video frame image. For example, in a scene in which a video is played while being shot, when it is detected that the target object does not change within 2 s, a currently shot image is acquired as the first video frame image, i.e., the last frame image within 2 s.

Step S23: selecting, from the original video, a second video frame image in which a target object is contained, and separating, from the second video frame image, an image portion occupied by the target object in the second video frame image.

The second video image is the latest video image collected when the playing time of the original video exceeds the preset duration (for example, 2 s). Inside the video segment of the preset duration, the image portion occupied by the target object does not change, but when the preset duration is exceeded, the image portion occupied by the target object changes. That is, the finally obtained image portion in the first video frame image that is occupied by the target object contained in the first video frame image is different from the image portion occupied by the target object in the second video frame image.

Step S24: performing transparentization processing on the image portion occupied by the target object in the second video frame image to obtain a transparentized image, and superposing the transparentized image on the first video frame image to obtain a special effect image.

The target object is separated from the current image within the preset duration. When the preset time is reached, the image portion occupied by the target object in the second video frame image is superposed on the first video frame image with the preset transparency.

Step S25: replacing, in the original video, the second video frame image with the special effect image to form a target video.

Specifically, taking an example that the target object is a human image, in this step, the target object (for example, a user) is required to keep one same pose in the video image for the preset duration (for example, 2 s). When the preset duration is reached, the out-of-body specific effect as shown in FIG. 1c is triggered, that is, there is a translucent human image activity.

For the detailed description of the step S21 and the steps S23 to S25, reference is made to the above embodiment 1, which is not repeated herein.

Embodiment 3

Figure 3:
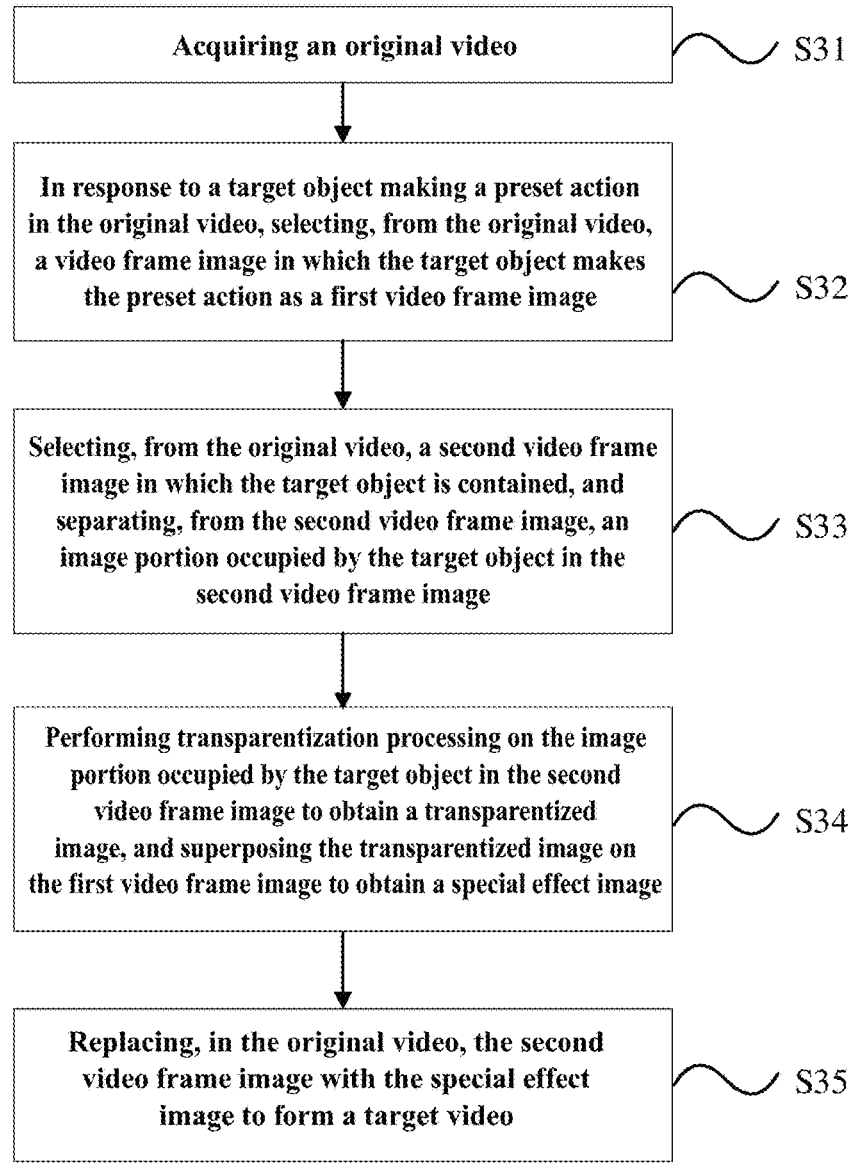
FIG. 3 is a schematic flow diagram of an image processing method according to an embodiment of the present disclosure.

On the basis of the foregoing embodiments, the present embodiment further limits the step of selecting, from the original video, a first video frame image. Based on this limitation, a specific implementation of the present embodiment is as shown in FIG. 3, comprising the following step S31 to step S35.

Step S31: acquiring an original video.

Step S32: in response to the target object making a preset action in the original video, selecting, from the original video, a video frame image in which the target object makes the preset action as the first video frame image.

The preset action can be a preset pose (for example, an OK gesture, waving hand, shaking head, etc.), or a pose change of the target object, for example, a change from full squat to half squat, a change from half squat to standing up, or a change from lowering head to raising head, etc.

Step S33: selecting, from the original video, a second video frame image in which the target object is contained, and separating, from the second video frame image, an image portion occupied by the target object in the second video frame image.

The target object is contained in the first video frame image, and an image portion occupied by the target object in the first video frame image is different from the image portion occupied by the target object in the second video frame image.

Step S34: performing transparentization processing on the image portion occupied by the target object in the second video frame image to obtain a transparentized image, and superposing the transparentized image on the first video frame image to obtain a special effect image.

Step S35: replacing, in the original video, the second video frame image with the special effect image to form a target video.

For the detailed description of the step S31 and the steps S33 to S35, reference is made to the embodiment 1, which is not repeated herein.

It should be appreciated by those of skill in the art that obvious modifications (for example, combinations of the enumerated modes) or equivalent replacements can be made on the basis of the various embodiments described above.

In the above, although the steps in the embodiment of the image processing method are described in the above sequence, it should be clear to those skilled in the art that the steps in the embodiment of the present disclosure are not necessarily performed in the above sequence, and they can also be performed in other sequences such as reverse sequence, parallel sequence, and cross sequence, and moreover, on the basis of the above steps, those skilled in the art can also add other steps, and these obvious modifications or equivalent replacements should also be comprised in the protection scope of the present disclosure, which is not repeated herein.

The following is an apparatus embodiment of the present disclosure, which can be used for performing the steps of the implementations of the method embodiments of the present disclosure. For ease of description, only a portion related to the embodiment of the present disclosure are shown, and for specific technical details that are not disclosed, reference can be made to the method embodiments of the present disclosure.

Embodiment 4

Figure 4:
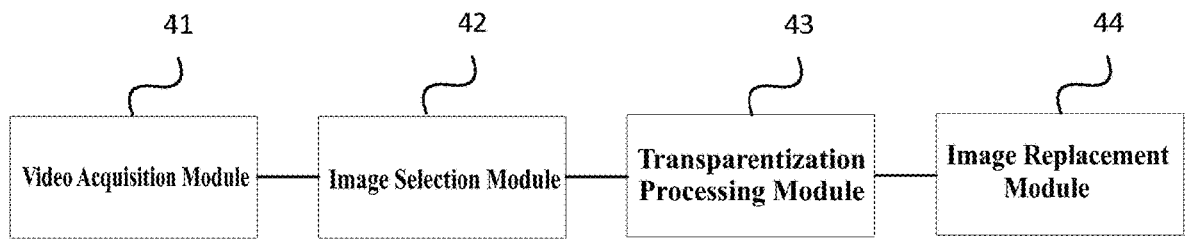
FIG. 4 is a schematic structural diagram of an image processing apparatus according to an embodiment of the present disclosure.

In order to solve the technical problem that the display effect of the image special effect function is not flexible enough in the related art, in the embodiment of the present disclosure, there is provided an image processing apparatus. The apparatus can perform the steps in the embodiments of the image processing method described in the embodiments 1, 2 and 3. As shown in FIG. 4, the apparatus mainly comprises: a video acquisition module 41, an image selection module 42, a transparentization processing module 43 and an image replacement module 44, wherein the video acquisition module 41 is configured to acquire an original video;

the image selection module 42 is configured to select, from the original video, a first video frame image;

the image selection module 42 is further configured to select, from the original video, a second video frame image in which a target object is contained, and separate, from the second video frame image, an image portion occupied by the target object in the second video frame image;

the transparentization processing module 43 is configured to perform transparentization processing on the image portion occupied by the target object in the second video frame image to obtain a transparentized image, and superimpose the transparentized image on the first video frame image to obtain a special effect image; and the image replacement module 44 is configured to replace, in the original video, the second video frame image with the special effect image to form a target video.

Further, the target object is contained in the first video frame image, and an image portion occupied by the target object in the first video frame image is different from the image portion occupied by the target object in the second video frame image.

Further, the image selection module 42 is specifically configured to: in response to an image portion occupied by the target object in one video segment of a preset duration in the original video not changing, selecting, from the video segment, the first video frame image.

Further, the first video frame image is the last frame image within the duration of the original video.

Further, the image selection module 42 is specifically configured to: in response to the target object making a preset action in the original video, selecting, from the original video, a video frame image in which the target object makes the preset action as the first video frame image.

Further, the target object is a human image.

Further, the transparentization processing module 43 is specifically configured to: acquire first pixel values of red-blue-green three-color channels that correspond to the first video frame image; acquire second pixel values of red-blue-green three-color channels that correspond to the image portion occupied by the target object in the second video frame image; and determine a special effect image in accordance with the first pixel values, the second pixel values, and a preset transparency.

Further, the transparentization processing module 43 is specifically configured to: determine the special effect image in accordance with formulae $r=r1\times(1-a)+r0\times a$, $g=g1\times(1-a)+g0\times a$, and $b=b1\times(1-a)+b0\times a$, where r, g, and b are pixel values of red, green, and blue channels that correspond to the special effect image, respectively, r1, g1, and b1 are pixel values of red, green, and blue channels that correspond to the first video frame image, respectively, and r0, g0, and b0 are pixel values of red, green, and blue channels that correspond to the image portion occupied by the target object in the second video frame image, respectively.

For the detailed description of the working principle, the technical effect achieved, and the like of the embodiment of the image processing apparatus, reference can be made to the related description in the foregoing embodiments of the image processing method, which is not repeated herein.

Embodiment 5

Figure 5:
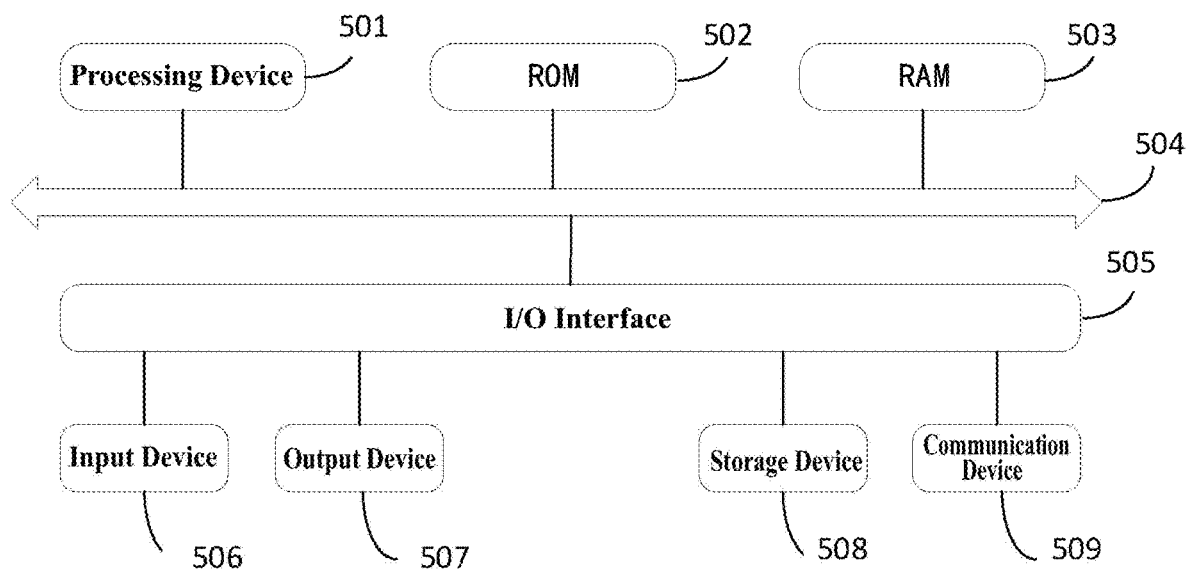
FIG. 5 is a schematic structural diagram of an electronic device according to an embodiment of the present disclosure.

Reference is now made to FIG. 5 below, which shows a schematic diagram of an electronic device 500 suitable for implementing the embodiments of the present disclosure. The electronic device or terminal device in the embodiment of the present disclosure can comprise, but is not limited to, a mobile terminal such as a mobile phone, a notebook computer, a digital broadcast receiver, a PDA (personal digital assistant), a PAD (tablet computer), a PMP (portable multimedia player), a vehicle-mounted terminal (for example, a vehicle-mounted navigation terminal), and the like, and a fixed terminal such as a digital TV, a desktop computer, and the like. The electronic device shown in FIG. 5 is only one example, and should not bring any limitation to the function and the scope of use of the embodiments of the present disclosure.

As shown in FIG. 5, the electronic device 500 can comprise a processing device (for example, a central processing unit, a graphics processor, etc.) 501 that can perform various appropriate actions and processing according to a program stored in a read-only memory (ROM) 502 or a program loaded from a storage device 508 into a random access memory (RAM) 503. In the RAM 503, various programs and data required for the operation of the electronic device 500 are also stored. The processing device 501, the ROM 502, and the RAM 503 are connected to each other through a bus 504. An input/output (I/O) interface 505 is also connected to the bus 504.

Generally, the following devices can be connected to the I/O interface 505: an input device 506 comprising, for example, a touch screen, touch pad, keyboard, mouse, camera, microphone, accelerometer, gyroscope, etc.; an output device 507 comprising, for example, a liquid crystal display (LCD), a speaker, a vibrator, etc.; a storage device 508 comprising, for example, a magnetic tape, a hard disk, etc.; and a communication device 509. The communication device 509 can allow the electronic device 500 to communicate with other devices wirelessly or by wire to exchange data. While FIG. 5 illustrates the electronic device 500 having various devices, it should be understood that not all illustrated devices are required to be implemented or provided. More or fewer devices can be alternatively implemented or provided.

In particular, according to the embodiments of the present disclosure, the process described above with reference to the flow diagram can be implemented as a computer software program. For example, the embodiments of the present disclosure comprise a computer program product comprising a computer program carried on a non-transitory computer-readable medium, the computer program containing program codes for performing the methods illustrated by the flow diagrams. In such an embodiment, the computer program can be downloaded and installed from a network via the communication device 509, or installed from the storage device 508, or installed from the ROM 502. The computer program, when being executed by the processing device 501, performs the above functions defined in the methods of the embodiments of the present disclosure.

It should be noted that the computer-readable medium of the present disclosure can be a computer-readable signal medium or a computer-readable storage medium or any combination of the above two. The computer-readable storage medium can be, for example, but is not limited to, an electronic, magnetic, optical, electromagnetic, infrared, or semiconductor system, apparatus, or device, or any combination of the above. More specific examples of the computer-readable storage medium can comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium that can have thereon contained or stored a program for use by or in conjunction with an instruction execution system, apparatus, or device. And, in the present disclosure, the computer-readable signal medium can comprise a data signal propagated in baseband or as part of a carrier wave, in which computer-readable program codes are carried. Such a propagated data signal can take a variety of forms that comprise, but are not limited to, an electro-magnetic signal, an optical signal, or any suitable combination of the above. The computer-readable signal medium can also be any computer-readable medium other than a computer-readable storage medium, and the computer-readable signal medium can send, propagate, or transport a program for use by or in conjunction with an instruction execution system, apparatus, or device. The program codes contained on the computer-readable medium can be transmitted using any appropriate medium, which comprises but is not limited to: a wire, an optical cable, RF (radio frequency), etc., or any suitable combination of the above.

In some embodiments, a client and a server can communicate using any currently known or future developed network protocol, such as HTTP (Hyper Text Transfer Protocol), and can be interconnected with any form or medium of digital data communication (for example, a communication network). Examples of the communication network comprise a local area network ("LAN"), a wide area network ("WAN"), an internet (for example, the Internet), and a peer-to-peer network (for example, ad hoc peer-to-peer network), as well as any currently known or future developed network.

The above computer-readable medium can be contained in the electronic device; and can also exist alone and not be assembled into the electronic device.

The above computer-readable medium has thereon carried one or more programs which, when being executed by the electronic device, cause the electronic device to: acquire an original video; select, from the original video, a first video frame image; select, from the original video, a second video frame image in which a target object is contained, and separate, from the second video frame image, an image portion occupied by the target object in the second video frame image; perform transparentization processing on the image portion occupied by the target object in the second video frame image to obtain a transparentized image, and superpose the transparentized image on the first video frame image to obtain a special effect image; and replace, in the original video, the second video frame image with the special effect image to form a target video.

Computer program codes for performing operations of the present disclosure can be written in one or more programming languages or any combination thereof, wherein the programming language comprises but is not limited to an object-oriented programming language such as Java, Smalltalk, C++, and further comprises a conventional procedural programming language, such as the "C" programming language or a similar programming language. The program codes can be executed entirely on a user's computer, partly on the user's computer, as a stand-alone software package, partly on the user's computer and partly on a remote computer, or entirely on the remote computer or server. In a scene where the remote computer is involved, the remote computer can be connected to the user's computer through any type of network, which comprises a local area network (LAN) or a wide area network (WAN), or can be connected to an external computer (for example, connected through the Internet using an Internet service provider).

The flow diagrams and block diagrams in the accompanying drawings illustrate the possibly implemented architectures, functions, and operations of the system, method and computer program product according to various embodiments of the present disclosure. In this regard, each block in the flow diagrams or block diagrams can represent one module, program segment, or portion of codes, which contains one or more executable instructions for implementing a specified logic function. It should also be noted that, in some alternative implementations, the functions noted in the blocks can occur in a different order from the order noted in the drawings. For example, two blocks shown in succession can, in fact, be executed substantially concurrently, or the blocks can sometimes be executed in a reverse order, which depends upon the functions involved. It will also be noted that each block of the block diagrams and/or flow diagrams, and a combination of blocks in the block diagrams and/or flow diagrams, can be implemented by a special-purpose hardware-based system that performs the specified function or operation, or by a combination of special-purpose hardware and computer instructions.

Involved units described in the embodiments of the present disclosure can be implemented by software or hardware. A name of the unit, in some cases, does not constitute a limitation on the unit itself, for example, the first acquisition unit can also be described as a "unit for acquiring at least two internet protocol addresses".

The functions described above herein can be performed, at least in part, by one or more hardware logic components. For example, without limitation, an exemplary type of hardware logic components that can be used comprises: a field programmable gate array (FPGA), an application specific integrated circuit (ASIC), an application specific standard product (ASSP), a system on chip (SOC), a complex programmable logic device (CPLD), and the like.

In the context of The present disclosure, the machine-readable medium can be a tangible medium that can have thereon contained or stored a program for use by or in conjunction with an instruction execution system, apparatus, or device. The machine-readable medium can be a machine-readable signal medium or a machine-readable storage medium. The machine-readable medium can comprise, but is not limited to, an electronic, magnetic, optical, electromagnetic, infrared, or semiconductor system, apparatus, or device, or any suitable combination of the above. More specific examples of the machine-readable storage medium would comprise an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

According to one or more embodiments of the present disclosure, there is provided an image processing method, comprising:

acquiring an original video;

selecting, from the original video, a first video frame image; selecting, from the original video, a second video frame image in which a target object is contained, and separating, from the second video frame image, an image portion occupied by the target object in the second video frame image;

performing transparentization processing on the image portion occupied by the target object in the second video frame image to obtain a transparentized image, and superposing the transparentized image on the first video frame image to obtain a special effect image; and replacing, in the original video, the second video frame image with the special effect image to form a target video.

Further, the target object is contained in the first video frame image, and an image portion occupied by the target object in the first video frame image is different from the image portion occupied by the target object in the second video frame image.

Further, the selecting, from the original video, a first video frame image is specifically:

in response to an image portion occupied by the target object in one video segment with a preset duration in the original video not changing, selecting, from the video segment, the first video frame image.

Further, the first video frame image is the last frame image in the preset duration in the original video.

Further, the selecting, from the original video, a first video frame image is specifically:

in response to the target object making a preset action in the original video, selecting, from the original video, a video frame image in which the target object makes the preset action as the first video frame image.

Further, the target object is a human image.

Further, the performing transparentization processing on the image portion occupied by the target object in the second video frame image to obtain a transparentized image, and superimposing the transparentized image on the first video frame image to obtain a special effect image comprises:

acquiring first pixel values of red-blue-green three-color channels that correspond to the first video frame image;

acquiring second pixel values of red-blue-green three-color channels that correspond to the image portion occupied by the target object in the second video frame image; and determining the special effect image in accordance with the first pixel values, the second pixel values, and a preset transparency.

Further, the determining the special effect image in accordance with the first pixel values, the second pixel values, and a preset transparency comprises:

determining the special effect image in accordance with formulae $r=r1\times(1-a)+r0\times a$, $g=g1\times(1-a)+g0\times a$, and $b=b1\times(1-a)+b0\times a$, where r, g, and b are pixel values of red, green, and blue channels that correspond to the special effect image, respectively, r1, g1, and b1 are pixel values of red, green, and blue channels that correspond to the first video frame image, respectively, and r0, g0, and b0 are pixel values of red, green, and blue channels that correspond to the image portion occupied by the target object in the second video frame image, respectively, a represents the preset transparency and a takes a value greater than 0 and less than 1.

According to one or more embodiments of the present disclosure, there is provided an image processing apparatus comprising:

a video acquisition module configured to acquire an original video;

an image selection module configured to select, from the original video, a first video frame image;

the image selection module further configured to select, from the original video, a second video frame image in which a target object is contained, and separate, from the second video frame image, an image portion occupied by the target object in the second video frame image;

a transparentization processing module configured to perform transparentization processing on the image portion occupied by the target object in the second video frame image to obtain a transparentized image, and superpose the transparentized image on the first video frame image to obtain a special effect image; and an image replacement module configured to replace, in the original video, the second video frame image with the special effect image to form a target video.

Further, the target object is contained in the first video frame image, and an image portion occupied by the target object in the first video frame image is different from the image portion occupied by the target object in the second video frame image.

Further, the image selection module is specifically configured to: in response to an image portion occupied by the target object in one video segment with a preset duration in the original video not changing, select, from the video segment, the first video frame image.

Further, the first video frame image is the last frame image in the preset duration in the original video.

Further, the image selection module is specifically configured to: in response to the target object making a preset action in the original video, select, from the original video, a video frame image in which the target object makes the preset action as the first video frame image.

Further, the target object is a human image.

Further, the transparentization processing module is specifically configured to: acquire first pixel values of red-blue-green three-color channels that correspond to the first video frame image; acquire second pixel values of red-blue-green three-color channels that correspond to the image portion occupied by the target object in the second video frame image; and determine the special effect image in accordance with the first pixel values, the second pixel values, and a preset transparency.

Further, the transparentization processing module is specifically configured to: determine the special effect image in accordance with formulae $r=r1\times(1-a)+r0\times a$, $g=g1\times(1-a)+g0\times a$, and $b=b1\times(1-a)+b0\times a$, where r, g, and b are pixel values of red, green, and blue channels that correspond to the special effect image, respectively, r1, g1, and b1 are pixel values of red, green, and blue channels that correspond to the first video frame image, respectively, and r0, g0, and b0 are pixel values of red, green, and blue channels that correspond to the image portion occupied by the target object in the second video frame image, respectively, a represents the preset transparency and a takes a value greater than 0 and less than 1.

According to one or more embodiments of the present disclosure, there is provided an electronic device, comprising:

a memory configured to store non-transitory computer-readable instructions; and a processor configured to execute the computer-readable instructions, which, when being executed, cause the processer to implement the image processing method described above.

According to one or more embodiments of the present disclosure, there is provided a non-transitory computer-readable storage medium configured to store computer-readable instructions which, when being executed by a computer, cause the computer to perform the image processing method described above.

The foregoing description is only the preferred embodiments of the present disclosure and is illustrative of the applied technical principles. It should be appreciated by those skilled in the art that the scope involved in the present disclosure is not limited to the technical solution formed by the specific combination of the above technical features, but should also encompass other technical solutions formed by arbitrary combinations of the above technical features or equivalent features thereof without departing from the concepts of the disclosure. For example, a technical solution is formed by replacing the above features with technical features having similar functions to those disclosed (but not limited to) in the present disclosure.

Furthermore, while operations are depicted in a specific order, this should not be understood as requiring that such operations be performed in the specific order shown or in a sequential order. Under certain circumstances, multitasking and parallel processing may be advantageous. Similarly, while several specific implementation details are contained in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or method logic actions, it should be understood that the subject matter defined in the attached claims is not necessarily limited to the specific features or actions described above. Conversely, the specific features and actions described above are only example forms in which the claims are implemented.

We claim:
1. An image processing method, comprising:
acquiring an original video;
selecting, from the original video, a first video frame image, wherein a target object is contained in the first video frame image;
selecting, from the original video, a second video frame image in which the target object is contained, and separating, from the second video frame image, an image portion occupied by the target object in the second video frame image;
performing processing on the image portion occupied by the target object in the second video frame image to obtain a semitransparent image, and superposing the semitransparent image on the first video frame image to obtain a special effect image; and
replacing, in the original video, the second video frame image with the special effect image to form a target video,
wherein the selecting, from the original video, a first video frame image comprises:
in response to an image portion occupied by the target object in one video segment with a preset duration in the original video not changing, selecting, from the video segment, the first video frame image; or
in response to the target object making a preset action in the original video, selecting, from the original video, a video frame image in which the target object makes the preset action as the first video frame image.

2. The method as claimed in claim 1, wherein an image portion occupied by the target object in the first video frame image is different from the image portion occupied by the target object in the second video frame image.

3. The method as claimed in claim 2, wherein the first video frame image is the last frame image in the preset duration in the original video.

4. The method as claimed in claim 1, wherein the target object is a human image.

5. The method as claimed in claim 1, wherein the performing processing on the image portion occupied by the target object in the second video frame image to obtain a semitransparent image, and superimposing the semitransparent image on the first video frame image to obtain a special effect image comprises:
acquiring first pixel values of red-blue-green three-color channels that correspond to the first video frame image;
acquiring second pixel values of red-blue-green three-color channels that correspond to the image portion occupied by the target object in the second video frame image; and
determining the special effect image with use of the first pixel values, the second pixel values, and a preset transparency, wherein the preset transparency represents a degree of transparency which is between completely opaque and completely transparent of the semitransparent image.

6. The method as claimed in claim 5, wherein the determining the special effect image with use of the first pixel values, the second pixel values, and a preset transparency comprises:
determining the special effect image in accordance with formulae $r = r_1 \times (1-\alpha) + r_0 \times \alpha$, $g = g_1 \times (1-\alpha) + g_0 \times \alpha$, and $b = b_1 \times (1-\alpha) + b_0 \times \alpha$, where r, g, and b are pixel values of red, green, and blue channels that correspond to the special effect image, respectively, $r_1$, $g_1$, and $b_1$ are pixel values of red, green, and blue channels that correspond to the first video frame image, respectively, and $r_0$, $g_0$, and $b_0$ are pixel values of red, green, and blue channels that correspond to the image portion occupied by the target object in the second video frame image, respectively, $\alpha$ represents the preset transparency and $\alpha$ takes a value greater than 0 and less than 1 wherein "0" represents being completely opaque and "1" represents being completely transparent.

7. An electronic device, comprising:
a memory configured to store non-transitory computer-readable instructions; and
a processor configured to execute the computer-readable instructions which, when being executed, cause the processer to perform the operations of
acquiring an original video;
selecting, from the original video, a first video frame image, wherein a target object is contained in the first video frame image;
selecting, from the original video, a second video frame image in which the target object is contained, and separating, from the second video frame image, an image portion occupied by the target object in the second video frame image;
performing processing on the image portion occupied by the target object in the second video frame image to obtain a semitransparent image, and superposing the semitransparent image on the first video frame image to obtain a special effect image; and
replacing, in the original video, the second video frame image with the special effect image to form a target video,
wherein the selecting, from the original video, a first video frame image comprises:
in response to an image portion occupied by the target object in one video segment with a preset duration in the original video not changing, selecting, from the video segment, the first video frame image; or
in response to the target object making a preset action in the original video, selecting, from the original video, a video frame image in which the target object makes the preset action as the first video frame image.

8. The electronic device as claimed in claim 7, wherein an image portion occupied by the target object in the first video frame image is different from the image portion occupied by the target object in the second video frame image.

9. The electronic device as claimed in claim 8, wherein the first video frame image is the last frame image in the preset duration in the original video.

10. The electronic device as claimed in claim 7, wherein the target object is a human image.

11. The electronic device as claimed in claim 7, wherein the performing processing on the image portion occupied by the target object in the second video frame image to obtain a semitransparent image, and superimposing the semitransparent image on the first video frame image to obtain a special effect image comprises:
acquiring first pixel values of red-blue-green three-color channels that correspond to the first video frame image;
acquiring second pixel values of red-blue-green three-color channels that correspond to the image portion occupied by the target object in the second video frame image; and
determining the special effect image with use of the first pixel values, the second pixel values, and a preset transparency, wherein the preset transparency represents a degree of transparency which is between completely opaque and completely transparent of the semitransparent image.

12. The electronic device as claimed in claim 11, wherein the determining the special effect image with use of the first pixel values, the second pixel values, and a preset transparency comprises:

determining the special effect image in accordance with formulae $r=r1\times(1-\alpha)+r0\times\alpha$, $g=g1\times(1-\alpha)+g0\times\alpha$, and $b=b1\times(1-\alpha)+b0\times\alpha$, where r, g, and b are pixel values of red, green, and blue channels that correspond to the special effect image, respectively, r1, g1, and b1 are pixel values of red, green, and blue channels that correspond to the first video frame image, respectively, and r0, g0, and b0 are pixel values of red, green, and blue channels that correspond to the image portion occupied by the target object in the second video frame image, respectively, $\alpha$ represents the preset transparency and $\alpha$ takes a value greater than 0 and less than 1, wherein "0" represents being completely opaque and "1" represents being completely transparent.

13. A non-transitory computer-readable storage medium configured to store computer-readable instructions which, when being executed by a computer, cause the computer to perform the operations of acquiring an original video;

selecting, from the original video, a first video frame image, wherein a target object is contained in the first video frame image;

selecting, from the original video, a second video frame image in which the target object is contained, and separating, from the second video frame image, an image portion occupied by the target object in the second video frame image;

performing processing on the image portion occupied by the target object in the second video frame image to obtain a semitransparent image, and superposing the semitransparent image on the first video frame image to obtain a special effect image; and replacing, in the original video, the second video frame image with the special effect image to form a target video, wherein the selecting, from the original video, a first video frame image comprises:

in response to an image portion occupied by the target object in one video segment with a preset duration in the original video not changing, selecting, from the video segment, the first video frame image; or in response to the target object making a preset action in the original video, selecting, from the original video, a video frame image in which the target object makes the preset action as the first video frame image.

* * * * *